US007857989B2

(12) United States Patent
Beardwood et al.

(10) Patent No.: US 7,857,989 B2
(45) Date of Patent: *Dec. 28, 2010

(54) METAL OXIDES DISPERSANT COMPOSITION

(75) Inventors: Edward S. Beardwood, Newmarket (CA); Kostan B. Charkhutian, Westwood, NJ (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 959 days.

This patent is subject to a terminal disclaimer.

(21) Appl. No.: 11/685,408

(22) Filed: Mar. 13, 2007

(65) Prior Publication Data

US 2007/0151927 A1 Jul. 5, 2007

Related U.S. Application Data

(63) Continuation of application No. 10/340,318, filed on Jan. 10, 2003, now Pat. No. 7,204,937, which is a continuation of application No. 09/790,211, filed on Feb. 21, 2001, now abandoned.

(60) Provisional application No. 60/185,828, filed on Feb. 29, 2000.

(51) Int. Cl.
C02F 5/10 (2006.01)
(52) U.S. Cl. .............. 252/180; 252/387; 210/698; 210/701
(58) Field of Classification Search .............. 252/180, 252/387; 210/698, 701
See application file for complete search history.

(56) References Cited

U.S. PATENT DOCUMENTS

| 3,506,707 A | 4/1970 | Miller et al. |
| 3,706,717 A | 12/1972 | Siegele |
| 3,879,288 A | 4/1975 | Siegele |
| 3,898,037 A | 8/1975 | Lange et al. |
| 4,029,577 A | 6/1977 | Godlewski et al. |
| 4,231,866 A | 11/1980 | Moser et al. |
| 4,255,259 A | 3/1981 | Hwa et al. |
| 4,269,702 A | 5/1981 | Milner et al. |
| 4,306,991 A | 12/1981 | Hwa et al. |
| 4,487,745 A | 12/1984 | Weiss et al. |
| 4,692,317 A | 9/1987 | Greaves |
| 4,913,823 A | 4/1990 | Lipinski et al. |
| 4,931,206 A | 6/1990 | McDonald et al. |
| 4,952,324 A | 8/1990 | McDonald et al. |
| 5,091,108 A | 2/1992 | Harder et al. |
| 5,108,619 A | 4/1992 | McDonald et al. |
| 5,128,427 A | 7/1992 | Chen |
| 5,167,835 A | 12/1992 | Harder |
| 5,169,537 A | 12/1992 | Chen |
| 5,264,155 A | 11/1993 | Yorke |
| 5,316,696 A | 5/1994 | Tury |
| 5,376,731 A | 12/1994 | Kerr et al. |
| 5,660,736 A | 8/1997 | Bizot et al. |
| 5,750,037 A | 5/1998 | Bizot et al. |
| 5,876,623 A | 3/1999 | Tang et al. |
| 6,337,047 B1 | 1/2002 | Charkhutian et al. |
| 7,204,937 B2 * | 4/2007 | Beardwood et al. ......... 252/180 |
| 2003/0086816 A1 | 5/2003 | Dewitt-Dick et al. |

OTHER PUBLICATIONS

Douglas B. Dewitt-Dick et al., The Impact of Methyl Ethyl Ketoxime on Utility Steam Cycle Corrosion Mitigation and Oxide Transport, Ashland Specialty Chemical Co., Drew Industrial Division, Jun. 2, 1999, pp. 1-7.

Bill Turowski, Holly Unit 3 Boiler Cleaning with Mekor, Holly Unit 3, 165 MW, B&W Boiler 1870 PSIG, 1,300,000 LB/HR Steam, Apr. 11, 1997.

Drew Industrial Division Boiler Water Treatment, On-line Deposit Weight Density Reduction, Midwestern Electric Utility, 900 psig Steam Generator, MEKOR Inhibitor date unknown.

John Wiley & Sons, Inc., Corrosion and Corrosion Control, An introduction to corrosion science and engineering, Library of Congress Catalog Card No. 63-8052 pp. 57-63.

Drew Industrial Division Boiler Water Treatment, On-line Deposit Weight Density Reduction, Midwestern Electric Utility, 900 psig Steam Generator, MEKOR Inhibitor.

John Wiley & Sons, Inc., Edited by R. Winston Revie, Uhlig's Corrosion Handbook, Second Edition, 2000, pp. 165-171.

Lawrence J. Korb, et al., ASM Internationl Handbook Comm., Metals Handbook vol. 13 Corrosion Metals Park, Ohio, 1987, pages (Glossary of Terms).

Kaj D. Rondum et al., Improved Chemical Treatment Program for Optimum Corrosion Control in a Combined Cycle Power Plant, Ashland Specialty Chemical Co., Boonton, NJ., 2001, pp. 1-7.

Regis R. Rumpf et al., Update on the Application of Methyl Ethyl Ketoxime for Corrosion Control in High Pressure Steam Generating Systems, Ashland Chemical Co., Drew Industrial Div., Boonton, NJ, 1992, 1995, pp. 1-8.

(Continued)

Primary Examiner—Cephia D Toomer
(74) Attorney, Agent, or Firm—Connolly Bove Lodge & Hutz LLP

(57) ABSTRACT

This invention relates to metal oxides dispersant compositions comprising (a) certain a metal oxides dispersant, and (b) an oxime. The invention also relates to a process for dispersing metal oxides in an aqueous system that involves adding the dispersant composition to the aqueous system.

35 Claims, No Drawings

OTHER PUBLICATIONS

Kaj D. Rondum, et al., The Use of a Continuous On-Line Chemical Reductant Analyzer for Effective Monitoring and Control of Oxygen Scavenger Dosing, Ashland Chemical Co., Drew Industrial Division, Boonton, NJ 07005, 1991, pp. 1-9.

Kaj D. Rondum, et al., Field Operating Experiences with a Unique Volatile Oxygen Scavenger/Metal Passivator in a High Pressure Utility Circuit, Ashland Chemical Co., Drew Industrial Div., Boonton NJ, 1990, 2001. pp. 1-8.

William J. Gonzalez, Field Experiences Relative to Corrosion Monitoring in Evaluating Oxygen Scavenger Efficacy, Ashland Chemical Co., Drew Industrial Div., Boonton, NJ. 1990, 1995, pp. 1-12.

Paul F. Pelosi et al., The Chemistry of Hydrazine and Methyl Ethyl Ketoxime Under Hydrothermal Conditions, Ashland Chemical Company, Drew Industrial Division, Boonton, NJ. 1986 pp. 1-11.

Rumpf Regis R et al: "No Single Answer Controls Corrosion"; Power Eng Barrington Ill; Power Engineering (Barrington, Illinois) Jan. 1993, vol. 97, No. 1, Jan. 1993, pp. 33-35, XP009098802 p. 35, second and third columns.

Cappabianca Carl J et al. "Experience With a Novel, Volatile Boiler Water Oxygen Scavenger" Annu Meet Int Water Conf 1985 Engineers' Soc of Western Pennsylvania, Pittsburgh, PA, USA, 1985, pp. 558-565, XP009098803 *the whole document*.

* cited by examiner

METAL OXIDES DISPERSANT COMPOSITION

CROSS REFERENCE TO RELATED APPLICATIONS

This application is a Continuation of co-pending application Ser. No. 10/340,318, filed on Jan. 10, 2003; which is a continuation of application Ser. No. 09/790,211, filed on Feb. 21, 2001; which is a continuation-in-part of Application No. 60/185,828, filed on Feb. 29, 2000, and for which priority is claimed under 35 U.S.C. §120.

FIELD OF THE INVENTION

This invention relates to metal oxides dispersant compositions comprising (a) a metal oxides dispersant, and (b) an oxime. The invention also relates to a process for dispersing metal oxides in an aqueous system that involves adding the dispersant composition to the aqueous system.

BACKGROUND OF THE INVENTION

The mitigation of corrosion in steam generating systems is vital to the continued efficient operation of the system. The formation of metal oxides on metal surfaces, particularly iron oxide, results in reduced heat transfer rates. These insulating deposits result in an increased metal temperature which, over time, result in creep failure of the metal. Unfortunately, these deposits are also somewhat porous which can lead to evaporative concentration of other salts within the deposit-undergoing wick boiling. The concentration effect can then result in localized attack of the metal surface beneath said porous deposits. Such attack will dissolve or gouge out a portion of the metal surface, lowering the yield and rupture strength, thus leading to rupture or fracture type failures of the metal under going heat transfer. In order to avoid such failures, steam generators must be maintained free of corrosion and other deposits by 1) minimizing corrosion in the system and/or 2) minimizing the deposition of the corrosion products found in the feedwater of the thermal system.

One means of minimizing the deposition of corrosion-forming solids is by dispersing the solids, such as corrosion products, that are found in feedwater thus avoiding fouling of heat input surfaces found in thermal system cycle. Over the years, many chemicals have been used for dispersing corrosion-forming solids in the feedwater. Early examples were inorganic phosphates, naturally derived and modified lignin, tannins, and carboxymethyl cellulose.

Later, synthetic polymers were developed to improve upon these modified natural derivative dispersants. One of the first generations of synthetic polymers was homopolymers, such as polyacrylamide, polyacrylate, and polymethylacrylate. Copolymers, terpolymers, and quadrapolymers were also developed with different monomeric functional groups wherein the ratios of these monomers and the average molecular weights of the final polymer were varied. The dispersant properties of these homopolymers, copolymers, terpolymers, and quadrapolymers are due to the use of anionic functionalities, nonionic functionalities or both (anionic/nonionic) functionalities into their backbone. The anionic monomer functionality can be derived from carboxylates, sulfonates, phosphonates, phosphinate, amido or acrylamide containing groups. The nonionic monomer functionality can be derived from vinyl acetate, ethylacrylate, tertbutylacrylamide, isobutylene, ethylene glycol, ethoxylate, alkyl, or aryl containing groups.

Examples of these dispersants include, hydrolyzed or partially hydrolyzed acrylamides/acrylates, hydroxypropylacrylate, phosphino carboxylates, phosphonate functional polymers, polymaleates, sulfonated styrene/maleic anhydride copolymers, polycarboxylated phosphonates, acrylate/acrylamide copolymers, acrylate/maleic copolymers, acrylamido methyl propane sulfonate/acrylate (AMPS/AA) copolymer, maleic/isobutylene copolymer isopropenylphosphonic/alkyl or aryl copolymer, acrylic/maleic/AMPS terpolymer, acrylic/AMPS/t-butylacrylamide terpolymer, acrylic/maleic/vinyl acetate terpolymer, acrylic/methacrylic/t-butyl acrylamide terpolymer, acrylic/AMPS/styrene sulfonate terpolymer, acrylic/AMPS/phosphinate terpolymer, ethoxylated aryl sulfonate/alkyl sulfonate and acrylic acid quadrapolymer, hydroxylamine substituted polyacrylate/acrylamide copolymers, hydrazine substituted polyacrylate polymers and nonionic polymers used in steam generating systems Around the same time synthetic polymers were being investigated as solids dispersants, low molecular weight phosphonates were also being developed as solids dispersants. Examples of such phosphonates include aminotrimethylene phosphonic acid, hydroxyethylidene diphosphonic acid, phosphonobutane tricarboxylic acid, hexamethylene diamine tetramethylene phosphonic acid, diethylene triamine pentamethylene phosphonic acid, bis(hexamethylene) triamine phosphonic acid, ethanolamine diphosphonic acid, diaminocyclohexane tetrakis (methylene phosphonic acid), methylpentane diamine tetrakis (methylene phosphonic acid), bis(hexamethylene) triamine phosphonic acid, phosphono succinic acid, phosphono tartaric acid, and phosphono glutaric acid.

It is known to use methyl ethyl ketoxime (MEKO) as an oxygen scavenger and metal passivator in boilers. See, for instance, U.S. Pat. No. 4,487,745. This patent indicates that the amount of oxime used in treating boiler water is from 0.0001 ppm to 500 ppm, although commercial utility plant experience indicates that the typical dosage of MEKO used to control feedwater oxygen scavenging is from 30-80 ppb. MEKO controls corrosion in the feedwater circuit by scavenging oxygen and by establishing a corrosion-resistant oxide film on waterside metallic surfaces. In several cases, sodium polymethacrylate was present in the boiler to minimize the deposition of corrosion-forming solids, and MEKO was present in the boiler to scavenge oxygen.

SUMMARY OF THE INVENTION

It has been discovered that the efficacy of well-known dispersants used to disperse corrosion products such as metal oxides in aqueous systems are enhanced by the addition of an oxime to the aqueous system. Thus, this invention relates to a metal oxides and corrosion products dispersant composition for aqueous systems comprising:

a) a metal oxides dispersant, and b) an effective amount of an oxime that enhances the dispersion efficacy of (a)

The invention also relates to a process for dispersing metal oxides in an aqueous system that involves adding the dispersant composition to the aqueous system. When practicing the process of this invention, it is possible to feed the solids metal dispersant composition and the oxime separately to the point of contact, as long as they ultimately are mixed together. The effect of the process is to inhibit the fouling and subsequent corrosion of metal surfaces exposed to an aqueous system, in particular, the metal surface of a steam generator such as a boiler, heat recovery steam generator, evaporator, crystallizer, vapor re-compression equipment, or any vessel being cooled with water or water solution in which the heat input is capable of generating steam under a vacuum, pressure or atmospheric conditions.

Using the oximes in combination with a solids metal dispersant increases the efficiency of the solids metal dispersant in the aqueous system. The dispersant compositions are particularly useful when added to the feedwater of steam generating equipment. When so used, there is a decrease in the settling rate of suspended solids and/or an increase in the concentration of solids remaining in suspension. The practical effect is to prevent feedwater solids, such as corrosion products from depositing on the metal heat transfer surfaces in a steam generation system. The use of the dispersant composition and process will result in cost savings because there is less need for the cleaning of operating heat exchange equipment and premature failures due to overheats and corrosion. Further savings are also realized because heat inputted to the heat exchanging portions of the system are transferred more efficiently because less deposit fouling is incurred on the heat exchanger surfaces.

BEST MODE AND OTHER MODES

The oximes used in the dispersant compositions are described in U.S. Pat. No. 4,487,745, which is hereby incorporated by reference and shown by the following chemical structure:

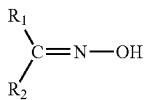

wherein $R_1$ and $R_2$ are the same or different and are selected from hydrogen, lower alkyl groups of 1-8 carbon atoms and aryl groups, and mixtures thereof, particularly aliphatic oximes. Most preferably used as the oxime is methyl ethyl ketoxime (MEKO). The oxime is preferably added to a feedpoint that will activate the oxime. Such feedpoints are those that will expose the oxime to a temperature of about 30° C. to about 320° C.

For purposes of describing this invention, a "metal oxides dispersant" for an aqueous system is defined as any monomeric or polymeric, inorganic or organic composition that increases the surface charge of metal oxides found in an aqueous system and has some effect on suspending the particle in the aqueous system. Metals of particular interest are iron, copper, nickel, and others that have more than one oxidation state. The metal oxides in the aqueous system can be from any source, including metal oxides formed as corrosion products in the aqueous system.

The metal oxides solids disperants used are selected from the group consisting of (a) multifunctional polymers and (b) inorganic dispersants. For purposes of this invention, a polymer includes dimers and oligomers. A multifunctional polymer is a polymer derived from at least two different monomers or is a polymer having more than one functional group, where the functional group is an anionic or nonionic functional group. When the multifunctional polymer is derived from at least two monomers, at least two of the monomers are present in the amount of from 1:99 to 99:1. More typically used are modified homopolymers, copolymers, terpolymers, and quadrapolymers that incorporate anionic functionalities, nonionic functionalities, or both (anionic/nonionic) functionalities into the backbone of the polymer. The anionic monomer functionality is typically derived from carboxylates, sulfonates, phosphonates, phosphino, amido or acrylamide containing groups. The nonionic monomer functionality is typically derived from vinyl acetate, ethylacrylate, tertbutylacrylamide, isobutylene, ethylene glycol, ethoxylate, alkyl, or aryl containing groups.

Other solids dispersants typically used include phosphonate functional polymers such as those disclosed in U.S. Pat. No. 5,512,183 (which is hereby, incorporated by reference), e.g. Betz HTP-2, polyphosphates, and orthophosphates.

The solids dispersants also include salts of any of the solids dispersants mentioned, mixtures thereof, or those modified for testability, traceability, or control using techniques such as "tagged polymers", "tracer" polymer dispersants, and "tracer" automated chemical testing and chemical feed control systems.

Preferably used as polymeric solids metal dispersants are copolymers, terpolymers, and quadrapolymers that incorporate anionic functionalities, nonionic functionalities, or both (anionic/nonionic) functionalities into the backbone of the polymer. More preferably used are copolymers, terpolymers, and quadrapolymers selected from the group consisting of hydrolyzed or partially hydrolyzed acrylamides/acrylates (see U.S. Pat. No. 4,001,161, which is hereby incorporated by reference), sulfonated styrene/maleic anhydride copolymers (see U.S. Pat. Nos. 4,255,259 and 4,306,991).

Preferably used as the hydrolyzed or partially hydrolyzed acrylamides/acrylates are low molecular weight soluble polymers having average molecular weight of 500-10,000, most preferably from 2000-6000. Example of commercially available water-soluble hydrolyzed or partially hydrolyzed acrylamide/acrylates polymers is Cyanamer P-35 from Cytec Industries sold as a 50% aqueous solution. See U.S. Pat. No. 4,001,161.

Preferably used as the sulfonated styrene/maleic anhydride copolymers are high molecular weight water-soluble polymers typically having average molecular weight from 1,000 to 7,000,000, preferably from 5000 to 1,000,000, most preferably from 10,000 to 100,000. Examples of commercially available water-soluble sulfonated styrene/maleic anhydride copolymers are Versa TL-4 sold as a 25% aqueous solution, and Versa TL-3 sold as 95% solids. Both materials are from Alco.

Also used on a preferable basis are water-soluble phosphinate solids dispersants, which are low molecular weight water-soluble phosphino carboxylate polymers or salts thereof having an average molecular weight from about 1,000 to 200,000, preferably from 2,000 to 5,000. See, for example, U.S. Pat. No. 4,692,317 and U.S. Pat. No. 2,957,931, which are hereby incorporated by reference. Such polymers are available from, among others, BIOLABS. Examples of a commercially available water-soluble phosphino carboxylic polymers are DP-3385 sold as a 40% aqueous solution and Belsperse 161 sold as a 50% aqueous solution, which are both available from BIOLABS.

The weight ratio of solids dispersant to oxime is from 0.5:1 to 20:1, preferably from 0.5:1.0 to 5:1.

The typical residual of dispersant used in an aqueous system to inhibit metal oxide corrosion is from 1 to 100 ppm, more typically 2 to 50 ppm, preferably 5 to 25 ppm in the steam generator water. The preferable residual is based on the continuous feed of 100 ppb to 500 ppb (0.1-0.5 ppm) oxime in the feedwater and the boilers operating at 50 to 100 cycles with about 5 to 25 ppm active dispersant cycled up in the boiler. In other words, the dispersant is 0.05 to 0.25 ppm at 100 cycles to 0.1 to 0.5 ppm at 50 cycles in the feedwater.

Because the oxime is activated by heating at a temperature of at least 65° C., it is preferred to add the dispersant composition to a feedpoint in the steam generation system where the dispersant composition is heated before final steam generation. Typically, the dispersant composition is added to the bulk water, or pre-boiler section.

Although it is possible to use the subject process for treating other aqueous systems, it is particularly useful for treating boiler water because the pressure in a boiler causes significant amounts of metal oxide to deposit on metal surfaces.

ABBREVIATIONS

BELSPERSE Belsperse 161, a phospinocarboxylate dispersant sold by BIOLABS.
DEQUEST DEQUEST 2060 S, diethylenetriaminepentamethylene phosphonic acid, a dispersant sold by Solutia.
HACR a hydrolyzed or partially hydrolyzed acrylamidel acrylate dispersant sold by Cytec Industries.
HTP-2 phosphonated/nonionic alkyl polymeric dispersant sold by Betz Dearborn or Hercules Betz Dearborn.
MEKO methyl ethyl ketoxime.
VERSA VERSA-TL3 or VERSA-TL4, a sulfonated styrene/maleic anhydride copolymer dispersant sold by Alco.

EXAMPLES

The specific examples are merely illustrative of the invention, but are not intended to restrict the scope of the present invention.

The test results described in Table I were performed by activating MEKO; conditioning MEKO with iron oxide ($Fe_2O_3$) in a water bath to form conditioned MEKO/iron oxide; adding autoclaved dispersants to the conditioned MEKO/iron oxide blend to form MEKO/iron oxide/dispersant blends; and finally comparing the dispersion efficacy of MEKO/iron oxide/dispersant blends to that of MEKO/iron oxide, dispersant/iron oxide, and deionized water/iron oxide (Control) blends.

In order to better simulate use conditions in a boiler and see the effect of MEKO, MEKO was first activated by autoclaving MEKO for one hour at 166° C. MEKO solutions (36750-37000 ppm) were prepared using deionized water, which was previously sparged with nitrogen for about two hours and pH adjusted to 9.0 using borate buffer. The conditioning of the iron oxide was carried out by mixing dilute (963-971 ppm) activated MEKO with 0.2 gm of iron oxide in 100 ml of deionized water which was previously sparged with air, and pH adjusted to 10.5±0.1. The blends of activated MEKO/iron oxide were kept in a water bath for about 43 hours. The temperature of the bath was maintained at ~85° C. In addition to MEKO/iron oxide blends, deionized water/iron oxide blends were placed in the water bath, which were used either as a blank (Control) or with the dispersants. All blends were shaken twice, for five minutes at high speed in the shaker after 18-19 hours and 23-24 hours in the water bath. The ratio of dispersant to iron oxide (boiler water solids; corrosion products) is an artifact of the laboratory test. The conditioning ratio of oxime to iron oxide was carried out at concentration ratios practiced in the field.

Known concentrations (1000±10 ppm as solids/actives) of dispersants were prepared and pH adjusted to 10.5±0.1. The dispersants were autoclaved for three hours at 260° C. After the conditioning of MEKO/iron oxide blends is completed, a known amount (9.5-9.8 ppm as solids/actives) of dispersants is added to some of the conditioned MEKO/iron oxide blends. The pH of the blends that consist of the a control (blank)/iron oxide, MEKO/iron oxide, dispersant/iron oxide, and MEKO/iron oxide/dispersant was adjusted to 10±0.1 using dilute caustic soda, or dilute acetic acid in the case of HTP-2. All blends were shaken for a total of 21 minutes. Portions are withdrawn from suspensions and transferred into spectrophotometer cells. After five minutes, absorbances are read at 450 nm using Hatch DR/2000 spectrophotometer. High absorbance values indicate improved dispersion. The blank and MEKO values are the average of six absorbance readings collected throughout the evaluations. The dispersants and dispersants with MEKO values are the average of 2-3 absorbance readings. The results are set forth in Table I.

TABLE I

DISPERSANT COMPOSITIONS AND THEIR EFFECT ON DISPERSION

| Example | Chemical | Absorbency (nm) |
|---|---|---|
| Control | None | ~0.775 |
| A | MEKO | ~0.700 |
| B | BELSPERSE | ~0.800 |
| 1 | MEKO + B | ~1.350 |
| C | HACR | ~0.900 |
| 2 | MEKO + C | ~1.650 |
| D | HTP-2 | ~0.950 |
| 3 | MEKO + D | ~1.650 |
| E | VERSA | ~0.925 |
| 4 | MEKO + E | ~1.800 |
| F | DEQUEST | ~0.820 |
| 5 | MEKO + F | ~1.400 |

The data in Table I show that there is a significant increase in suspended solids in the solutions tested, if a mixture of MEKO and a solids dispersant is used to disperse the iron oxide in the solution. THUS, MEKO enhances the functioning of the solids dispersant. This suggests that less corrosion products will deposit on the internal surfaces, e.g. heat exchange surfaces, of a steam generating system that is treated with a dispersant composition containing both MEKO and a solids dispersant.

What is claimed is:

1. A process for improving the dispersability of metal oxides in an aqueous system which comprises:
    adding to an aqueous system a composition comprising:
        (a) a water-soluble, hydrolyzed or partially hydrolyzed, copolymer of acrylamide monomers and acrylate monomers, and
        (b) methyl ethyl ketoxime,
    wherein the weight ratio of (a) to (b) is from 0.5:1 to 20:1, and whereby (a) and (b) can be added separately at the same location, or independent locations, or as a mixture.

2. The process of claim 1 wherein the aqueous system is in contact with the metal surface of a heat exchanger of a steam generating system which contains residual dispersant and the weight ratio of (a) to (b) is from 0.5:1.0 to 5:1.

3. The process of claim 2, wherein the steam generator residual dispersant is from 1 to 100 ppm.

4. The process of claim 3, wherein the steam generator residual dispersant is from 2 to 50 ppm.

5. The process of claim 4, wherein the steam generator residual dispersant is from 5 to 25 ppm.

6. The process of claim 5, wherein the oxime is added to a feedpoint which will expose the said methyl ethyl ketoxime to a temperature of at least 65° C.

7. A process for improving the dispersability of metal oxides in an aqueous system which comprises:
    adding to an aqueous system a composition comprising:
        (a) a sulfonated styrene/maleic anhydride, and (b) methyl ethyl ketoxime,
wherein the weight ratio of (a) to (b) is from 0.5:1 to 20:1, and whereby (a) and (b) can be added separately at the same location, or independent locations, or as a mixture.

8. The process of claim 7, wherein the aqueous system is in contact with the metal surface of a heat exchanger of a steam generating system which contains residual dispersant and the weight ratio of (a) to (b) is from 0.5:1.0 to 5:1.

9. The process of claim 8, wherein the steam generator residual dispersant is from 1 to 100 ppm.

10. The process of claim 9, wherein the steam generator residual dispersant is from 2 to 50 ppm.

11. The process of claim 10, wherein the steam generator residual dispersant is from 5 to 25 ppm.

12. The process of claim 11, wherein the oxime is added to a feedpoint which will expose the said methyl ethyl ketoxime to a temperature of at least 65° C.

13. The process of claim 1, wherein the composition comprises a dispersant wherein the dispersant is selected from the group consisting of an orthophosphate, a polyphosphate, a phosphonate, and mixtures thereof.

14. The process of claim 7, wherein the composition comprises a dispersant wherein the dispersant is selected from the group consisting of an orthophosphate, a polyphosphate, a phosphonate, and mixtures thereof.

15. A dispersant composition for dispersing metal oxides in aqueous systems comprising:
   (a) a water-soluble, hydrolyzed or partially hydrolyzed, copolymer of acrylamide monomers and acrylate monomers, and
   (b) methyl ethyl ketoxime,
wherein the weight ratio of (a) to (b) is from 0.5:1 to 20:1.

16. The composition of claim 15, wherein the weight ratio of (a) to (b) is from 0.5:1.0 to 5:1.

17. The composition of claim 15, wherein the composition comprises a dispersant wherein the dispersant is selected from the group consisting of an orthophosphate, a polyphosphate, a phosphonate, and mixtures thereof.

18. A dispersant composition for dispersing metal oxides in aqueous systems comprising:
   (a) a sulfonated styrene/maleic anhydride, and
   (b) methyl ethyl ketoxime,
wherein the weight ratio of (a) to (b) is from 0.5:1 to 20:1.

19. The composition of claim 18, wherein the weight ratio of (a) to (b) is from 0.5:1.0 to 5:1.

20. The composition of claim 18, wherein the composition comprises a dispersant wherein the dispersant is selected from the group consisting of an orthophosphate, a polyphosphate, a phosphonate, and mixtures thereof.

21. A dispersant composition for dispersing metal oxides in aqueous systems comprising:
   (a) a phosphonated nonionic alkyl polymer, and
   (b) methyl ethyl ketoxime,
wherein the weight ratio of (a) to (b) is from 0.5:1 to 20:1.

22. The composition of claim 21, wherein the weight ratio of (a) to (b) is from 0.5:1.0 to 5.1.

23. The composition of claim 21, wherein the composition comprises a dispersant wherein the dispersant is selected from the group consisting of an orthophosphate, a polyphosphate, a phosphonate, and mixtures thereof.

24. A dispersant composition for dispersing metal oxides in aqueous systems comprising:
   (a) a phosphino carboxylate, and
   (b) an oxime,
wherein the weight ratio of (a) to (b) is from 0.5:1 to 20:1.

25. The composition of claim 24, wherein the oxime is methyl ethyl ketoxime.

26. The composition of claim 24, wherein the weight ratio of (a) to (b) is from 0.5:1.0 to 5:1.

27. The composition of claim 24, wherein the composition comprises a dispersant wherein the dispersant is selected from the group consisting of an orthophosphate, a polyphosphate, a phosphonate, and mixtures thereof.

28. A process for improving the dispersability of metal oxides in an aqueous system comprising:
   adding to an aqueous system a composition comprising:
   (a) a dispersant and
   (b) methyl ethyl ketoxime,
whereby (a) and (b) can be added separately at the same location or independent locations or as a mixture.

29. The process of claim 28, wherein the aqueous system is in contact with the metal surface of a heat exchanger of a steam generating system which contains residual dispersant and the weight ratio of (a) to (b) is from 0.5:1.0 to 5:1.

30. The process of claim 28, wherein the steam generator residual dispersant is from 1 to 100 ppm.

31. The process of claim 28, wherein the steam generator residual dispersant is from 2 to 50 ppm.

32. The process of claim 31, wherein the steam generator residual of the dispersant is from 5 to 25 ppm.

33. The process of claim 32, wherein the oxime is added to a feedpoint which will expose the said methyl ethyl ketoxime to a temperature of at least 65° C.

34. A dispersant composition for dispersing metal oxides in aqueous systems comprising:
   (a) a dispersant and
   (b) methyl ethyl ketoxime,
wherein the dispersant is selected from the group consisting of an orthophosphate, a polyphosphate, a phosphonate and mixtures thereof and wherein the weight ratio of (a) to (b) is from 0.5:1 to 20:1.

35. The composition of claim 34, wherein the weight ratio of (a) to (b) is from 0.5:1.0 to 5:1.

\* \* \* \* \*